3,075,958
PRODUCTION OF POLYMERIZATION PRODUCTS OF OLEFINE HYDROCARBONS WITH A CATALYST OF AN ALKALI METAL HYDRIDE ALUMINUM, CHLORIDE, AND TITANIUM CHLORIDE
Ernst-Guenther Kastning and Karl Wisseroth, Ludwigshafen (Rhine), Germany, assignors to Badische Anilin- & Soda-Fabrik Aktiengesellschaft, Ludwigshafen (Rhine), Germany
No Drawing. Filed June 18, 1956, Ser. No. 591,790
Claims priority, application Germany June 16, 1955
1 Claim. (Cl. 260—93.7)

This invention relates to the production of polymerization products of olefine hydrocarbons in the presence of catalysts.

German patent specification No. 874,215 relates to a process for the production of solid polyethylene according to which ethylene is polymerized in the presence of a mixture of aluminium chloride, titanium tetrachloride and metals which combine with hydrogen chloride. In this way a film-forming polymer is obtained but not always free from oily polymerization products.

We have now found that very high molecular weight film-forming polymers are exclusively obtained from olefine hydrocarbons by polymerizing them in the presence of a mixture of the hydride of a metal of the 1st or 2nd main group of the periodic system of elements, a halide of a metal of the 2nd or 3rd main group and a further metal compound. Among the polymerizable olefine hydrocarbons there come into question especially the olefines and of these especially the alpha-olefines, such as ethylene or propylene, as well as butylenes and mixtures of olefines, also diolefines, as for example butadiene or isoprene, as well as vinyl hydrocarbons, as for example styrene, and mixtures of various olefine hydrocarbons.

As metal hydrides there may be used for example the hydrides of the metals lithium, sodium, potassium, magnesium, calcium, strontium or barium. Furthermore there may frequently be used with special advantage complex metal hydrides of the formula Me(Me'H$_n$) in which Me is a metal of the 1st or 2nd main group and Me' a metal of the 2nd or 3rd main group of the periodic system of elements. An example of this class of compounds is lithium aluminium hydride. Mixtures of metal hydrides may also be used.

Especially suitable metal halides of the 2nd or 3rd main group are for example the halides, in particular the chlorides and bromides, of aluminium, beryllium or magnesium. Other halides of metals from the said two groups may also be used. Aluminium bromide can be used with special advantage by reason of its good solubility in hydrocarbons.

Suitable metal compounds which are to be used in addition to a hydride of a metal of the 1st or 2nd main group and a halide of a metal of the 2nd or 3rd main group, are in particular compounds of the metals of the subsidiary groups of the periodic system of elements, i.e. the transitional metals, as for example those of the general formula MeX$_m$ or MeO$_n$X$_p$. In this formula Me is a metal, in particular of the 4th, 5th, 6th, 7th or 1st subsidiary group or the 8th group of the periodic system of elements or mercury, O is oxygen and X is, for example, halogen, —CN, —SCN, —OR, —SR or

R can be a saturated or unsaturated, preferably ethylenically unsaturated aliphatic radical, furthermore a cycloaliphatic or aromatic radical. $m$ is the valency of the metal, $n$ is an integer between 1 and 2 and $p$ is an integer preferably between 1 and 3. For example the halides of the said metals, as for example iron-2-chloride, iron-3-bromide, cobalt chloride, nickel bromide, manganese-2-chloride, chromium-3-chloride, chromyl chloride (CrO$_2$Cl$_2$), halides of molybdenum or tungsten, vanadium-4-chloride, vanadium oxychloride (VOCl$_3$), halides of niobium and tantalum, titanium-4-chloride, titanium-3-chloride, zirconium-3-chloride, zirconium-4-bromide, hafnium-4-chloride or copper-2-chloride or mixtures of these with one another are especially suitable. There may, however, also be used for example the thiocyanates, as for example iron-3-thiocyanate, and also alkoxy compounds, such as titanic acid esters, organic metal compounds, as for example acetyl-acetonates, as well as the oxides of these metals.

All metal compounds are preferably used in a finely divided and anhydrous form. The ratio of metal hydride to the compound of a metal of the subsidiary groups can be varied within wide limits. Thus the compounds may be used in equivalent amounts, but this mixing ratio is not essential; on the contrary one or other of the components may be present in excess.

Thus for example the mixing ratio of 3 parts of metal compound to 1 part of hydride to 1 part of metal compound to 3 parts of hydride is especially advantageous. Larger excesses of the two types of compound are also possible. In this way the molecular weights of the resultant products easily can be varied by the factor 5 to 10.

An addition of up to about 10 equivalent percent of a metal halide of the 2nd or 3rd main group, with reference to the metal hydride, increases the speed of polymerization very considerably without markedly influencing the degree of polymerization. In this way for example hard and tough polymers of ethylene are obtained with excellent film formation, great strength and high melting point. By adding larger amounts of a halide of a metal of the 2nd or 3rd main group, however, for example 1 equivalent or more for each equivalent of metal hydride, the average molecular weight of the polymers obtained decreases considerably and the porducts assume the character of hard waxes. By varying the proportions, polymers can be obtained with intermediate properties.

Although the olefine hydrocarbons can be polymerized with the said catalyst mixtures in an unpurified state, it is preferable first to remove traces of impurities. For this purpose there may serve the known process in which the compound is led for example over silica gel or alkali metal. Furthermore impurities can be frozen out in known manner.

While it is possible to obtain solid olefine polymers without addition of metal halides of the 2nd or 3rd main group, it is only by the addition of these compounds that it is possible to increase considerably the speed of polymerization and at the same time to control the degree of polymerization.

The catalyst mixture is preferably dissolved or suspended in an indifferent organic liquid, as for example an aliphatic, cycloaliphatic or aromatic hydrocarbon, for example in petroleum ether, gasoline fractions, diesel oil, hexane, octane, cyclohexane or benzene. The polymerizable compound is allowed to act thereon under normal pressure or especially advantageously at pressures above about 20 atmospheres up to about 300 atmospheres. The reaction temperature preferably lies between about 15° and 250° C. but it is possible to polymerize in some cases at lower temperatures, for example at 0° C., and up to about 350° C. The most favorable temperature range lies between about 60° and 150° C. The polymerization can be carried out continuously or discontinuously. Atmospheric oxygen is preferably excluded. It is often especially advantageous to heat the mixture of the catalyst components for some time before leading in the olefine hydrocarbon to be polymerized, for example for some minutes to a few hours at about 40° to 100° C.

The polymers obtained are purified from inorganic constituents by known methods, for example by washing with dilute aqueous mineral acids or organic acids, as for example dilute hydrochloric acid, acetic acid or oxalic acid, or with solvents, such as acetone, ethers, as for example tetrahydrofurane, or especially advantageously with methanolic hydrochloric acid. The ash content of the purified polymers is in general considerably less than 0.5 percent. They have excellent mechanical properties, for example a high tensile strength, stability and high melting point, and may consequently be used with special advantage for all purposes for which it is customary to use high molecular weight polyolefines, as for example for the production of injection moldings and foils having excellent properties.

The following examples will further illustrate this invention but the invention is not restricted to these examples. The parts are parts by weight.

*Example 1*

2 parts of aluminium chloride, 30 parts of titanium-4-chloride and 5 parts of lithium hydride are introduced into a high pressure autoclave together with 500 parts of benzene. The autoclave is rinsed with nitrogen to remove atmospheric oxygen and the mixture is exposed to an ethylene pressure of 100 atmospheres at 80° C., the pressure being kept constant by continuous subsequent pressing-in of ethylene for 16 hours. The brown colored product is washed with methanolic hydrochloric acid and then with methanol. After removing the catalyst residue, there remain 610 parts of a tough, solid and film-forming polyethylene. It melts at between about 135° and 140° C. and has a limiting viscosity of 1.84. (All limiting viscosities are determined in decaline at 130° C.)

With the catalyst system lithium hydride/titanium-4-chloride no polymerization takes place under the conditions specified. It is only at at least 120° C., better at between about 150° and 180° C., that ethylene polymerization takes place to an appreciable extent. Even then the space-time yields are more than 70 percent worse than when aluminium chloride is added.

*Example 2*

30 parts of aluminium bromide, 18 parts of titanium-4-chloride and 10 parts of sodium hydride are introduced into a high pressure shaking autoclave with 500 parts of cyclohexane. Ethylene is then forced in at 80° C. under a pressure of 200 atmospheres for 16 hours. The polymer is treated with methanol to destroy the catalyst and then washed with aqueous oxalic acid. 490 parts of a polymer similar to hard wax are obtained. The limiting viscosity of this wax lies at 0.64 (in decaline at 30° C.). It has great hardness, good surface gloss and melts at 126° C.

If the proportion of aluminium bromide in the catalyst is reduced to only 3 parts, there is obtained under the same conditions a polyethylene of considerably higher molecular weight having a limiting viscosity (intrinsic viscosity) of 2.20. The yield is about the same.

If the amount of aluminium bromide added is reduced still further, the polymerization speed is lessened while the molecular weight is not substantially increased.

If only TiCl$_4$ and sodium hydride are used as the catalyst, no ethylene polymerization takes place until a temperature above 150° C.

*Example 3*

2 parts of aluminium chloride, 20 parts of calcium hydride and 50 parts of vanadium-5-oxychloride are introduced into a high pressure autoclave together with 500 parts of octane while excluding air. Ethylene under a pressure of 200 atmospheres is allowed to act on the mixture at 80° C. After 14 hours, 780 parts of polyethylene have been formed. It is purified by washing with methanol. The polymer is tough and of high molecular weight. The limiting viscosity is 2.09 (in decaline at 30° C.).

If under entirely the same conditions 50 parts of aluminium chloride are used instead of 2 parts of aluminium chloride, a product similar to hard wax is obtained having a considerably smaller average molecular weight.

*Example 4*

A high pressure autoclave containing 10 parts of aluminium chloride, 25 parts of lithium hydride and 10 parts of titanium-4-chloride dispersed in 1200 parts of petroleum ether is kept under an ethylene pressure of 30 atmospheres at 120° C. The ethylene used up is replaced by continuously forcing in more. After 24 hours, 1080 parts of polyethylene have been formed which is purified in the usual way with methanol. The polymer is tough and film-forming, has a tensile strength of more than 500 kilograms per square centimetre with an extension of 620 percent. It softens at 135° C.

*Example 5*

The catalyst mixture specified in Example 4 is exposed for 24 hours to a propylene pressure of 18 atmospheres under otherwise identical conditions. The polypropylene obtained is a soft, somewhat plastic material which softens at about 100° C. If low molecular weight constitutents are extracted therefrom with boiling hexane, its softening point rises to about 128° C. and the polymer becomes harder and tougher.

The polymerization of alpha-butylene under the same conditions at 8 to 10 atmospheres pressure leads to a yet softer polymer of the softening point 82° to 86° C., from which the low molecular weight constituents may be removed with ether, whereby the softening point and rigidity are increased. By polymerizing isobutylene in the same manner a sticky polymer is obtained.

*Example 6*

Into a high pressure shaking autoclave there are introduced 5 parts of aluminium bromide, 3 parts of vanadium-4-chloride and 12 parts of barium hydride together with 500 parts of cyclohexane. Ethylene under a pressure of 80 atmospheres is forced into this mixture at 100° C. After 10 hours the pressure has fallen to 33 atmospheres and 92 parts of a tough, high molecular weight polyethylene have been formed.

*Example 7*

Ethylene is allowed to act at 120° C. under a pressure of 200 atmospheres on 10 parts of finely ground lithium hydride, 4 parts of aluminium chloride and 15 parts of freshly-sublimed iron-3-chloride suspended in 500 parts of benzene in a high pressure autoclave. After 18 hours there have been formed 170 parts of a solid and tough polymer of the melting range 135° to 138° C. The iron-3-chloride may also be replaced by iron-2-chloride or chromium-3-chloride. The yield with iron-2-chloride is about the same as with iron-3-chloride and with chromium-3-chloride about 50 percent higher.

*Example 8*

3 parts of lithium hydride, 2 parts of titanium-4-chloride and 2 parts of anhydrous magnesium chloride are introduced together with 200 parts of benzene into a high pressure shaking autoclave and at 160° C. ethylene is allowed to act on the mixture under a pressure of 250 atmospheres. After 12 hours 62 parts of polyethylene have been formed. If the magnesium chloride be replaced by beryllium chloride under the same conditions, the yield of polymer may be increased to 88 parts. Both products are of high molecular weight.

*Example 9*

Ethylene under a pressure of 20 atmospheres is allowed to act on a mixture of 12 parts of lithium hydride, 2 parts of aluminium chloride and 5 parts of titanium-4-chloride in 800 parts of ligroin at 50° C. in a high pressure autoclave. The pressure is kept constant for 16 hours by subsequently forcing in ethylene. After purifying the product 480 parts of polyethylene are obtained as a loose white powder having a limiting viscosity of 2.68 (determined in decaline at 130° C.).

*Example 10*

A gas mixture consisting of 50 parts of ethylene and 50 parts of propylene is allowed to act at 70° C. and under a pressure of 20 atmospheres on a catalyst mixture of the same composition as in Example 8. The copolymer obtained is softer than polyethylene but not so tough. It is eminently suitable for the production of foils.

*Example 11*

A mixture of 4 parts of lithium hydride, 2 parts of titanium-4-chloride, 1 part of aluminium bromide and 250 parts of diesel oil is heated in a stirring vessel for 1 hour while centrifuging. The operation is carried out under an atmosphere of nitrogen. It is then cooled to 20° C. and a rapid stream of ethylene is charged through the mixture. The reaction temperature is kept between 15° and 20° C. by external cooling. After 6 hours, a stiff brown paste has formed in the reaction vessel and this is freed from solvent and washed with methanol. 71 parts of pulverulent polyethylene remain having a limiting viscosity of 3.42.

*Example 12*

100 parts of pure styrene are allowed to drip during the course of 90 minutes at 60° C. while stirring vigorously into a catalyst mixture prepared as in Example 10 using toluene as the solvent. After the whole has been stirred for a further 90 minutes, the polystyrene formed is precipitated with methanol and, after centrifuging, washed with methanol until a white powder remains. 68 parts of polystyrene are obtained.

*Example 13*

A catalyst mixture prepared as in Example 10 is brought together with 100 parts of isoprene at 60° C. in a pressure vessel. After 10 hours, a polymer similar to raw rubber may be isolated from the reaction mixture. It is kneaded in methanol for purification. It is dried under nitrogen and a very elastic vulcanizable rubber is obtained.

What we claim is:

In a polymerization process, the steps of contacting propylene under polymerization reaction conditions including a temperature of at least 100° C. and a pressure of at least 50 p.s.i.g. with an inert liquid hydrocarbon reaction medium containing a catalyst consisting essentially of a mixture of alkali metal hydride, aluminum trichloride and titanium chloride the mol ratio of said alkali metal hydride to titanium chloride being greater than one and similarly the mol ratio of alkali metal hydride to aluminum trichloride being also greater than one.

References Cited in the file of this patent

UNITED STATES PATENTS

| | | |
|---|---|---|
| 2,567,972 | Schlesinger et al. | Sept. 18, 1951 |
| 2,721,189 | Anderson et al. | Oct. 18, 1955 |
| 2,773,053 | Field et al. | Dec. 4, 1956 |
| 2,919,267 | Juveland et al. | Dec. 29, 1959 |
| 2,959,579 | Reed et al. | Nov. 8, 1960 |

FOREIGN PATENTS

| | | |
|---|---|---|
| 874,215 | Germany | July 8, 1949 |
| 538,782 | Belgium | Dec. 6, 1955 |

OTHER REFERENCES

Moeller: "Inorganic Chemistry," published by John Wiley & Sons (New York), 1952 (page 786 relied on).